US012584060B2

(12) United States Patent
O'Grady et al.

(10) Patent No.: US 12,584,060 B2
(45) Date of Patent: Mar. 24, 2026

(54) COMPOSITIONS AND METHODS FOR SCAVENGING SULFUR-CONTAINING COMPOUNDS

(71) Applicant: ChampionX USA Inc., Sugar Land, TX (US)

(72) Inventors: Jordan Kenneth Charles O'Grady, Calgary (CA); Nolan Miller, Calgary (CA); Boyd A. Laurent, Pearland, TX (US); Subhasis De, Sugar Land, TX (US); Julian M. Gallardo, III, Pearland, TX (US)

(73) Assignee: ChampionX USA Inc., Sugar Land, TX (US)

( * ) Notice: Subject to any disclaimer, the term of this patent is extended or adjusted under 35 U.S.C. 154(b) by 1 day.

(21) Appl. No.: 18/468,985

(22) Filed: Sep. 18, 2023

(65) Prior Publication Data

US 2024/0110091 A1 Apr. 4, 2024

Related U.S. Application Data

(60) Provisional application No. 63/376,506, filed on Sep. 21, 2022.

(51) Int. Cl.
*C09K 8/532* (2006.01)

(52) U.S. Cl.
CPC .................................... *C09K 8/532* (2013.01)

(58) Field of Classification Search
None
See application file for complete search history.

(56) References Cited

U.S. PATENT DOCUMENTS

| | | | | |
|---|---|---|---|---|
| 8,093,431 | B2 | 1/2012 | Falana et al. | |
| 8,530,394 | B2 | 9/2013 | Gatlin | |
| 8,663,457 | B2 | 3/2014 | Kaplan et al. | |
| 9,273,254 | B2 * | 3/2016 | Compton | C10G 29/20 |
| 9,278,307 | B2 | 3/2016 | Lehrer et al. | |
| 9,440,909 | B2 | 9/2016 | Kaplan | |
| 2012/0012505 | A1 * | 1/2012 | Compton | C10G 29/20 208/207 |
| 2012/0012507 | A1 * | 1/2012 | Compton | C10G 29/20 208/289 |
| 2013/0126429 | A1 | 5/2013 | Lue et al. | |
| 2013/0172623 | A1 * | 7/2013 | Kaplan | C10L 3/103 585/860 |
| 2016/0175769 | A1 | 6/2016 | Kamoun et al. | |
| 2016/0222762 | A1 * | 8/2016 | Geissler | C09K 8/528 |
| 2016/0230078 | A1 * | 8/2016 | Pou | C09K 8/54 |
| 2017/0335204 | A1 * | 11/2017 | Ekoue-Kovi | C10G 29/20 |
| 2018/0346794 | A1 * | 12/2018 | Shi | E21B 43/00 |
| 2019/0322948 | A1 | 10/2019 | Begeal et al. | |
| 2020/0123451 | A1 * | 4/2020 | Poukalov, Sr. | C10G 1/00 |

FOREIGN PATENT DOCUMENTS

| | | | |
|---|---|---|---|
| EP | 0882778 | A2 | 12/1998 |
| EP | 3505590 | A1 | 7/2019 |
| GB | 2282805 | B | 1/1998 |
| RU | 2612968 | C1 | 3/2017 |
| WO | 2017201393 | A1 | 11/2017 |

OTHER PUBLICATIONS

International Search Report and Written Opinion for PCT/US2023/033013, mailed Jan. 4, 2024, 9 pages.
Kandile, Nadia & M A Razek, Taha & Al-Sabagh, A. & Khattab, Maamoun. (2014). Synthesis and evaluation of some amine compounds having surface active properties as H2S scavenger. Egyptian Journal of Petroleum. 23. 10.1016/j.ejpe.2014.08.008.
Khan, Asad U., et al. "Synthesis and Evaluation of Some Amine Compounds Having Surface Active Properties as H2S Scavenger." Egyptian Journal of Petroleum. 2014. https://www.researchgate.net/publication/267047010_Synthesis_and_evaluation_of_some_amine_compounds_having_surface_active_properties_as_H2S_scavenger.
PCT International Preliminary Report on Patentability for PCT/US2023/033013 mailed on Apr. 3, 2025, 7 pages.

* cited by examiner

*Primary Examiner* — John J Figueroa
(74) *Attorney, Agent, or Firm* — Eric. D. Babych; Barnes & Thornburg LLP

(57) ABSTRACT

The present disclosure provides compositions and methods for reducing sulfur-containing compounds in a hydrocarbon fluid. The compositions include an alpha amino ether and a synergistic compound. Additionally, the compositions may include a third component. The third component may be, for example, a heteroatom-containing component or a solvent.

20 Claims, No Drawings

COMPOSITIONS AND METHODS FOR SCAVENGING SULFUR-CONTAINING COMPOUNDS

BACKGROUND

Sulfur-containing compounds, such as hydrogen sulfide ($H_2S$), mercaptans, and organic sulfides, can be present in hydrocarbon fluids as contaminants. Mitigating the concentration of sulfur-containing compounds in hydrocarbon fluids, such as heavy oil, is paramount to transporting produced hydrocarbon to downstream users safely. Removing sulfur-containing compounds, such as $H_2S$, reduces risks to personal safety and also minimizes corrosion-related asset integrity concerns. Effectively scavenging sulfur-containing compounds from heavy oil streams has been troublesome in the past due to multiple issues. For example, thermal heavy crude applications can experience sustained temperatures that can be detrimental to conventional sulfur scavengers, the viscous nature of heavy oil and the presence of minimal amounts of water can limit the reaction efficiency of conventional sulfur scavengers, volatile scavengers or formulation components can negatively impact production equipment via fouling, and residual sulfur scavenger and reaction products that are entrained in hydrocarbon have been found to be problematic for downstream refinery operations.

SUMMARY

The present disclosure provides compositions and methods for reducing an amount of a sulfur-containing compound present in a hydrocarbon fluid, where an effective amount of a composition is added to the hydrocarbon fluid, the composition comprising a sulfide scavenger including an alpha amino ether and a synergistic compound of Formula (I):

(I)

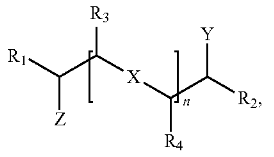

where n=1 or 2; X is $NR_5$, O, or S; Y is H, OH, SH, $NH_2$, NHR, NHCOR, SR, or OR; Z is H, OH, SH, $NH_2$, NHR, NHCOR, SR, or OR; R is H or a $C_1$-$C_{10}$ alkyl or alkenyl group; $R_1$ and $R_2$ are each independently H, a $C_1$-$C_{10}$ alkyl or alkenyl group, a cyclic group, a carbocyclic group, or a heterocyclic group; $R_3$ and $R_4$ are each independently H or a $C_1$-$C_{10}$alkyl or alkenyl group; and where $R_5$ is H or a $C_1$-$C_{10}$alkyl group.

DETAILED DESCRIPTION

The present disclosure provides compositions and methods for reducing an amount of a sulfur-containing compound present in a hydrocarbon fluid.

In some embodiments, a method for reducing an amount of a sulfur-containing compound present in a hydrocarbon fluid can include a step of adding to the hydrocarbon fluid an effective amount of a composition comprising a sulfide scavenger that is an alpha amino ether and a synergistic compound of Formula (I):

(I)

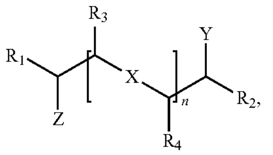

where n=1 or 2; X is $NR_5$, O, or S; Y is H, OH, SH, $NH_2$, NHR, NHCOR, SR, or OR; Z is H, OH, SH, $NH_2$, NHR, NHCOR, SR, or OR; R is H or a $C_1$-$C_{10}$ alkyl or alkenyl group; $R_1$ and $R_2$ are each independently H, a $C_1$-$C_{10}$ alkyl or alkenyl group, a cyclic group, a carbocyclic group, or a heterocyclic group; $R_3$ and $R_4$ are each independently H or a $C_1$-$C_{10}$alkyl or alkenyl group; and $R_5$ is H or a $C_1$-$C_{10}$ alkyl group.

In any of the foregoing embodiments, the alpha amino ether can have Formula (II)

(II)

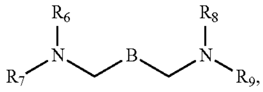

where $R_6$, $R_7$, $R_8$ and $R_9$ are each independently a $C_1$-$C_{20}$ alkyl group, and where B is an oxygen atom or a linear alkyl group having an oxygen atom at each end. By way of example, but not limitation, examples of alpha amino ethers are disclosed in U.S. Patent Publication No. 2012/0012507, which is incorporated herein by reference in its entirety.

As used herein, an "effective amount" refers to an amount effective to achieve a desired reduction in a sulfur-containing compound in a hydrocarbon fluid. By way of example, but not limitation, the reduction can be by at least 1%, at least 2%, at least 3%, at least 4%, at least 5%, at least 10%, at least 15%, at least 20%, at least 25%, at least 30%, at least 40%, at least 50%, at least 60%, at least 70%, at least 75%, at least 80%, at least 90%, or at least 95%.

In any of the foregoing embodiments, the alpha amino ether can be a condensation product of an aldehyde and a secondary amine. In some embodiments, the aldehyde is formaldehyde and the secondary amine is N-butyl-1-butanamine.

In any of the foregoing embodiments, the alpha amino ether can be present in the composition in an amount from about 5% to about 95% by weight out of the total weight of the composition. Preferably, the alpha amino ether can be present in an amount from about 50% to about 80% by weight out of the total weight of the composition. By way of example, but not limitation, the alpha amino ether can be present in the composition in an amount from about 5% to about 95%, about 5% to about 90%, about 5% to about 80%, about 5% to about 75%, about 5% to about 70%, about 5% to about 60%, about 5% to about 50%, about 5% to about 40%, about 5% to about 30%, about 5% to about 25%, about 5% to about 20%, about 5% to about 15%, about 5% to about 10%, about 10% to about 95%, about 10% to about 90%, about 10% to about 80%, about 10% to about 75%, about 10% to about 70%, about 10% to about 60%, about 10% to about 50%, about 10% to about 40%, about 10% to about 30%, about 10% to about 25%, about 10% to about 20%, about 10% to about 15%, about 15% to about 95%, about 15% to about 90%, about 15% to about 80%, about 15% to about 75%, about 15% to about 70%, about 15% to about 60%, about 15% to about 50%, about 15% to about 40%, about 15% to about 30%, about 15% to about 25%, about 15% to about 20%, about 20% to about 95%, about 20% to about 90%, about 20% to about 80%, about 20% to about 75%, about 20% to about 70%, about 20% to about 60%, about 20% to about 50%, about 20% to about 40%, about 20% to about 30%, about 20% to about 25%, about 25% to about 95%, about 25% to about 90%, about 25% to about 80%, about 25% to about 75%, about 25% to about 70%, about 25% to about 60%, about 25% to about 50%, about 25% to about 40%, about 25% to about 30%, about 30% to about 95%, about 30% to about 90%, about 30% to about 80%, about 30% to about 75%, about 30% to about 70%, about 30% to about 60%, about 30% to about 50%, about 30% to about 40%, about 40% to about 95%, about 40% to about 90%, about 40% to about 80%, about 40% to about 75%, about 40% to about 70%, about 40% to about 60%, about 40% to about 50%, about 50% to about 95%, about 50% to about 90%, about 50% to about 80%, about 50% to about 75%, about 50% to about 70%, about 50% to about 60%, about 60% to about 95%, about 60% to about 90%, about 60% to about 80%, about 60% to about 75%, about 60% to about 70%, about 70% to about 95%, about 70% to about 90%, about 70% to about 80%, about 70% to about 75%, about 75% to about 95%, about 75% to about 90%, about 75% to about 80%, about 80% to about 95%, about 80% to about 90%, about 90% to about 95%, about 5%, 10%, 15%, 20%, 25%, 30%, 40%, 50%, 60%, 70%, 75%, 80%, 90%, or 95% by weight out of the total weight of the composition.

In any of the foregoing embodiments, the synergistic compound can be a synergistic heteroatom-containing compound. In any of the foregoing embodiments, the synergistic compound can be selected from the group consisting of 1-[(2-hydroxypropyl)amino]-2-butanol, 1,1'-iminobis-2-butanol, 3,3'-iminobis[1,2-propanediol], bis(2-hydroxypropyl) ether, 1(2-aminopropyl)amino)-2-propanol, 1-[(2-methoxypropyl)amino]-2-propanol, 1,1'-iminodipropan-2-ol, diethanolamine, 2-[(2-methoxyethyl)amino]ethanol, ethanolisopropanolamine, 2-[(2-hydroxypropyl)amino]-1-propanol, bis(2-methoxyethyl)amine, 2-(2-aminoethylamino)ethanol, bis(2-aminoethyl)amine, 1,1'-(Methylimino)dipropan-2-ol, N-methyldiethanolamine, 2,2'-Thiodiethanol, derivatives thereof, and any combination thereof.

In any of the foregoing embodiments, the synergistic compound can be present in the composition in an amount from about 1% to about 95% by weight out of the total weight of the composition. In some embodiments, the synergistic compound can be present in an amount from about 5% to about 50% by weight out of the total weight of the composition. By way of example, but not limitation, the synergistic compound can be present in the composition in an amount from about 1% to about 95%, about 1% to about 90%, about 1% to about 80%, about 1% to about 75%, about 1% to about 70%, about 1% to about 60%, about 1% to about 50%, about 1% to about 40%, about 1% to about 30%, about 1% to about 25%, about 1% to about 20%, about 1% to about 15%, about 1% to about 10%, about 1% to about 5%, about 5% to about 95%, about 5% to about 90%, about 5% to about 80%, about 5% to about 75%, about 5% to about 70%, about 5% to about 60%, about 5% to about 50%, about 5% to about 40%, about 5% to about 30%, about 5% to about 25%, about 5% to about 20%, about 5% to about 15%, about 5% to about 10%, about 10% to about 95%, about 10% to about 90%, about 10% to about 80%, about 10% to about 75%, about 10% to about 70%, about 10% to about 60%, about 10% to about 50%, about 10% to about 40%, about 10% to about 30%, about 10% to about 25%, about 10% to about 20%, about 10% to about 15%, about 15% to about 95%, about 15% to about 90%, about 15% to about 80%, about 15% to about 75%, about 15% to about 70%, about 15% to about 60%, about 15% to about 50%, about 15% to about 40%, about 15% to about 30%, about 15% to about 25%, about 15% to about 20%, about 20% to about 95%, about 20% to about 90%, about 20% to about 80%, about 20% to about 75%, about 20% to about 70%, about 20% to about 60%, about 20% to about 50%, about 20% to about 40%, about 20% to about 30%, about 20% to about 25%, about 25% to about 95%, about 25% to about 90%, about 25% to about 80%, about 25% to about 75%, about 25% to about 70%, about 25% to about 60%, about 25% to about 50%, about 25% to about 40%, about 25% to about 30%, about 30% to about 95%, about 30% to about 90%, about 30% to about 80%, about 30% to about 75%, about 30% to about 70%, about 30% to about 60%, about 30% to about 50%, about 30% to about 40%, about 40% to about 95%, about 40% to about 90%, about 40% to about 80%, about 40% to about 75%, about 40% to about 70%, about 40% to about 60%, about 40% to about 50%, about 50% to about 95%, about 50% to about 90%, about 50% to about 80%, about 50% to about 75%, about 50% to about 70%, about 50% to about 60%, about 60% to about 95%, about 60% to about 90%, about 60% to about 80%, about 60% to about 75%, about 60% to about 70%, about 70% to about 95%, about 70% to about 90%, about 70% to about 80%, about 70% to about 75%, about 75% to about 95%, about 75% to about 90%, about 75% to about 80%, about 80% to about 95%, about 80% to about 90%, about 90% to about 95%, about 1%, 5%, 10%, 15%, 20%, 25%, 30%, 40%, 50%, 60%, 70%, 75%, 80%, 90%, or 95% by weight out of the total weight of the composition.

In any of the foregoing embodiments, the composition can further include a third component, which can be a heteroatom-containing component and/or a solvent. In any of the foregoing embodiments, the heteroatom-containing component or solvent can be selected from the group consisting of an aromatic (such as xylene, toluene, heavy aromatic naphtha (HAN)), an aliphatic solvent (such as a $C_{1-8}$ group, kerosene, an alcohol, a glycol, or a glycerol) an aliphatic alcohol, a glycol, and any combination thereof. In some embodiments, the heteroatom-containing component can be an aliphatic alcohol or a glycol. In some embodiments, the solvent can be a hydrocarbon solvent. In some embodiments, the third component can be a protic solvent capable of hydrogen bonding. In any of the foregoing embodiments, the aliphatic alcohol can be a $C_1$-$C_8$ alcohol or a $C_1$-$C_4$ alcohol. By way of example, but not limitation, the aliphatic alcohol can be selected from the group consisting of methanol, ethanol, isopropyl alcohol, 1-propanol, 2-propanol, 1-butanol, 2-butanol, 2-methyl-1-propanol, 2-methyl-2-propanol, and any combination thereof. In any of the foregoing embodiments, the glycol can be selected from the group consisting of ethylene glycol, diethylene glycol, triethylene glycol, propylene glycol, ethylene glycol monobutyl ether, ethylene glycol ethyl ether, dipropylene glycol methyl ether, a derivative thereof, and any combination thereof.

In any of the foregoing embodiments, the heteroatom-containing component can be present in an amount from about 10% to about 90% by weight out of the total weight of the composition. In some embodiments, the heteroatom-containing component can be present in an amount from about 10% to about 40% by weight out of the total weight of the composition. By way of example, but not limitation, the heteroatom-containing component can be present in an amount from about 10% to about 90%, about 10% to about 80%, about 10% to about 75%, about 10% to about 70%, about 10% to about 60%, about 10% to about 50%, about 10% to about 40%, about 10% to about 30%, about 10% to about 25%, about 10% to about 20%, about 10% to about 15%, about 15% to about 90%, about 15% to about 80%, about 15% to about 75%, about 15% to about 70%, about 15% to about 60%, about 15% to about 50%, about 15% to about 40%, about 15% to about 30%, about 15% to about 25%, about 15% to about 20%, about 20% to about 90%, about 20% to about 80%, about 20% to about 75%, about 20% to about 70%, about 20% to about 60%, about 20% to about 50%, about 20% to about 40%, about 20% to about 30%, about 20% to about 25%, about 25% to about 90%, about 25% to about 80%, about 25% to about 75%, about 25% to about 70%, about 25% to about 60%, about 25% to about 50%, about 25% to about 40%, about 25% to about 30%, about 30% to about 90%, about 30% to about 80%, about 30% to about 75%, about 30% to about 70%, about 30% to about 60%, about 30% to about 50%, about 30% to about 40%, about 40% to about 90%, about 40% to about 80%, about 40% to about 75%, about 40% to about 70%, about 40% to about 60%, about 40% to about 50%, about 50% to about 90%, about 50% to about 80%, about 50% to about 75%, about 50% to about 70%, about 50% to about 60%, about 60% to about 90%, about 60% to about 80%, about 60% to about 75%, about 60% to about 70%, about 70% to about 90%, about 70% to about 80%, about 70% to about 75%, about 75% to about 90%, about 75% to about 80%, about 80% to about 90%, about 10%, 15%, 20%, 25%, 30%, 40%, 50%, 60%, 70%, 75%, 80%, or 90% by weight out of the total weight of the composition.

In any of the foregoing embodiments, the hydrocarbon fluid can be selected from the group consisting of kerosene, light crude oil, medium crude oil, heavy crude oil, extra heavy crude oil, synthetic crude oil, an oilfield condensate, a petroleum residual, a refined fuel, a distillate fuel, a fuel oil, a heating oil, diesel fuel, gasoline, jet fuel, a bunker fuel oil, and any combination thereof. It should be understood that hydrocarbon fluids can be characterized as follows: Light crude oil: API gravity higher than about 31.1° API (less than 870 kg/$m^3$), Medium crude oil: API gravity from about 31.1° API to about 22.3° API (870 to 920 kg/$m^3$), Heavy crude oil: API gravity from about 22.3° API to about 10° API (920 to 1000 kg/$m^3$), Extra heavy crude oil: API gravity below about 10° API (higher than 1000 kg/$m^3$).

In any of the foregoing embodiments, the hydrocarbon fluid can contain at least 10% liquid by volume. By way of example, but not limitation, the hydrocarbon fluid can contain at least 10%, at least 15%, at least 20%, at least 25%, at least 30%, at least 40%, at least 50% or more liquid by volume.

Alternatively, in any of the foregoing embodiments, the hydrocarbon fluid can be a dehydrated gaseous medium or thermal heavy oil. In any such embodiments, the hydrocarbon fluid can contain 7 $lbs_{H2O}$/mmscf (0.11 g/$m^3$) or less. By way of example, but not limitation, the hydrocarbon fluid can contain 7 $lbs_{H2O}$/mmscf (0.11 g/$m^3$), 6 $lbs_{H2O}$/mmscf, 5 $lbs_{H2O}$/mmscf, 4 $lbs_{H2O}$/mmscf, 3 $lbs_{H2O}$/mmscf, 2 $lbs_{H2O}$/mmscf, 1 $lbs_{H2O}$/mmscf or less.

In any of the foregoing embodiments, the composition can be added to the hydrocarbon fluid in an amount sufficient that the alpha amino ether is present in the fluid an amount ranging from about 0.0001 wt. % to about 1.0 wt. %. In some embodiments, the composition can be added to the hydrocarbon fluid in an amount sufficient that the alpha amino ether is present in the fluid an amount ranging from about 0.01 wt. % to about 0.1 wt. %.

In any of the foregoing embodiments, the composition can be added to the hydrocarbon fluid in an amount sufficient that the synergistic compound is present in the fluid in an amount ranging from about 0.0001 wt. % to about 1.0 wt. %. In some embodiments, the composition can be added to the hydrocarbon fluid in an amount sufficient that the synergistic compound is present in the fluid in an amount ranging from about 0.0005 wt. % to about 0.01 wt. %.

In any of the foregoing embodiments, the sulfur-containing compound can be selected from the group consisting of hydrogen sulfide, a mercaptan, an organic sulfide, and any combination thereof.

EXAMPLES

Example 1

A composition of the present disclosure was prepared with the components as detailed in Table 1.

TABLE 1

| Name | CAS | Concentration (%) |
|---|---|---|
| Formaldehyde, reaction products with N-butyl-1-butanamine | 208852-57-7 | 65 |
| Methanol | 67-56-1 | 8.5 |
| Isopropyl Alcohol | 67-63-0 | 21.5 |
| Diisopropanolamine solution (90% diisopropanolamine, 10% deionized water) | 110-97-4 | 5 |

Diisopropanolamine is a solid at ambient temperature and is sold as a supernatant liquid.

Experimental determination of the $H_2S$ scavenging capacity of the experimental formulation was investigated by headspace $H_2S$ determination following a modified and site-specific version of ASTM D5705-03 "Standard Test Method for Measurement of Hydrogen Sulfide in the Vapour Phase Above Residual Fuel Oils".

Briefly, a 1200 mL rectangular container was filled to about 50% volume (600 g+/−0.5-1.0%) with produced heavy crude. The sample container was heated to about 80° C., and then held for a period of about 30 minutes to allow the temperature of the crude to equilibrate. Samples were then treated with an equivalent dosage to what an incumbent $H_2S$ scavenger chemistry was being applied at in a production environment. The volume of added $H_2S$ scavenger chemistry was 150 μL+/−0.5% in this specific experiment. The samples were then capped/sealed with septum caps, and then a group of treated samples was transferred to a mechanical shaker and shaken at about 180 oscillations per minute for a duration of about 3 minutes. After about 3 minutes, the container was rotated about 180° and shaken again for an additional 3 minutes. The total agitation time was about 6 minutes. The samples were placed back into the water bath and kept at a constant temperature of about 80° C. for a period of about 3 hours. At the end of about 3 hours, a gas detection tube was inserted to a pre-determined depth and a gas sample of the headspace was drawn into the tube using the appropriate type of piston hand pump. After the gas sample was allowed to react for the prescribed duration for the selected tube, the tube was extracted from the sample, the reading was converted, and the ppm of $H_2S$ was recorded.

Each subsequent series of samples included at least one blank, untreated sample, and the amount of $H_2S$ scavenged was determined using a mathematical formula.

The selected diisopropanol additive has been shown to increase the percentage of headspace $H_2S$ reduction by approximately 10% compared to an equivalent formulation of similar amine/aldehyde condensation reaction product in laboratory experiments.

Example 2

Different scavengers and combinations were tested for their ability to reduce $H_2S$. Results are shown in Table 2 (all amounts are weight percent, ppm is μL of chemistry per L of test fluid). The performance of the $H_2S$ Scavengers of interest were evaluated by a modified ASTM D5705 vapor phase method. A hydrocarbon sample of LVT-200 was purged with a hydrogen sulfide gas to introduce hydrogen sulfide into the liquid hydrocarbon. This soured hydrocarbon concentrate was added volumetrically to a 250 mL glass serum bottle containing 125 mL of fresh hydrocarbon (50% liquid/vapor ratio) containing the scavenger of interest pre-dosed and sealed with a septum and aluminum cap. Untreated tests were performed in parallel to treated tests for comparative purposes. The glass bottle was then placed into a dynamic heated box in which the sample was agitated at a temperature of 74° C. for a period of 30 minutes. Upon completion of the 30 minute period, the vapor phase $H_2S$ concentration was measured via $H_2S$ detection tube (Gastec brand) and sampling pump in the vapor space above the liquid.

TABLE 2

| Scavenger | Dose (ppm) | % $H_2S$ Reduction |
|---|---|---|
| Blank | 0 | 0 |
| 65% formaldehyde reaction products with N-butyl-1-butanamine/ 10% methanol/ 25% isopropanol | 160 | 76.7 |
| 65% formaldehyde reaction products with N-butyl-1-butanamine/ 10% diisopropanolamine/ 25% isopropanol | 160 | 88.9 |
| Blank | 0 | 0 |
| 65% formaldehyde reaction products with N-butyl-1-butanamine/ 10% methanol/ 25% isopropanol | 160 | 81.1 |
| 65% formaldehyde reaction products with N-butyl-1-butanamine/ 10% diisopropanolamine/ 25% isopropanol | 160 | 88.9 |
| Blank | 0 | 0 |
| Solid diisopropanolamine added to hydrocarbon | 275 | 20 |
| Solid diisopropanolamine added to hydrocarbon | 350 | 20 |
| 10% by weight diisopropanolamine dissolved in isopropanol | 200 | 9 |

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a synergistic compound" is intended to include "at least one synergistic compound" or "one or more synergistic compounds."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Any composition disclosed herein may comprise, consist of, or consist essentially of any element, component and/or ingredient disclosed herein or any combination of two or more of the elements, components or ingredients disclosed herein.

Any method disclosed herein may comprise, consist of, or consist essentially of any method step disclosed herein or any combination of two or more of the method steps disclosed herein.

The transitional phrase "comprising," which is synonymous with "including," "containing," or "characterized by," is inclusive or open-ended and does not exclude additional, un-recited elements, components, ingredients and/or method steps.

The transitional phrase "consisting of" excludes any element, component, ingredient, and/or method step not specified in the claim.

The transitional phrase "consisting essentially of" limits the scope of a claim to the specified elements, components, ingredients and/or steps, as well as those that do not materially affect the basic and novel characteristic(s) of the claimed invention.

Unless specified otherwise, all molecular weights referred to herein are weight average molecular weights and all viscosities were measured at 25° C. with neat (not diluted) polymers.

As used herein, the term "about" refers to the cited value being within the errors arising from the standard deviation found in their respective testing measurements, and if those errors cannot be determined, then "about" may refer to, for example, within 5%, 4%, 3%, 2%, or 1% of the cited value.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method for reducing an amount of a sulfur-containing compound present in a hydrocarbon fluid, comprising:

adding an effective amount of a composition to the hydrocarbon fluid, wherein the composition comprises a sulfide scavenger and a synergistic compound, wherein the sulfide scavenger comprises an alpha amino ether, and wherein the synergistic compound comprises Formula (I):

(I)

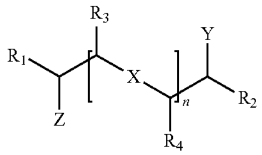

wherein n is 1 or 2,

X is $NR_5$, O, or S,

Y is H, OH, SH, $NH_2$, NHR, NHCOR, SR, or OR,

Z is H, OH, SH, $NH_2$, NHR, NHCOR, SR, or OR,

R is H or a $C_1$-$C_{10}$ alkyl or alkenyl group, $R_1$ and $R_2$ are each independently H, a $C_1$-$C_{10}$ alkyl or alkenyl group, a cyclic group, a carbocyclic group, or a heterocyclic group, $R_3$ and $R_4$ are each independently H or a $C_1$-$C_{10}$ alkyl or alkenyl group, and $R_5$ is H or a $C_1$-$C_{10}$ alkyl group, provided that the synergistic compound excludes diethanolamine.

2. The method of claim 1, wherein the composition comprises from about 5 wt. % to about 95 wt. % of the alpha amino ether.

3. The method of claim 1, wherein the composition comprises from about 1 wt. % to about 95 wt. % of the synergistic compound.

4. The method of claim 1, wherein the alpha amino ether comprises Formula (II):

(II)

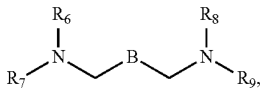

wherein $R_6$, $R_7$, $R_8$ and $R_9$ are each independently a $C_1$-$C_{20}$ alkyl group, and wherein B is an oxygen atom or a linear alkyl group having an oxygen atom at each end.

5. The method of claim 1, wherein the alpha amino ether is a condensation product of an aldehyde and a secondary amine.

6. The method of claim 5, wherein the aldehyde is formaldehyde, and wherein the secondary amine is N-butyl-1-butanamine.

7. The method of claim 1, wherein the synergistic compound is selected from the group consisting of 1-[(2-hydroxypropyl)maino]-2-butanol, 1,1'-iminobis-2-butanol, 3,3'-iminobis[1,2-propanediol], bis(2-hydroxypropyl) ether, 1(2-aminopropyl)amino)-2-propanol, 1-[(2-methoxypropyl) amino]-2-propanol, 1,1'-iminodipropan-2-ol, 2-[(2-methoxyethyl)amino]ethanol, ethanolisopropanolamine, 2-[(2-hydroxypropyl)amino]-1-propanol, bis(2-methoxyethyl)amine, 2-(2-aminoethylamino)ethanol, bis(2-aminoethyl)amine, 1,1'-(Methylimino)dipropan-2-ol, N-methyldiethanolamine, 2,2'-Thiodiethanol, derivates thereof, and any combination thereof.

8. The method of claim 1, wherein the composition further comprises a third component, wherein the third component is a heteroatom-containing component or a solvent.

9. The method of claim 8, wherein the heteroatom-containing component or solvent is selected from the group consisting of an aromatic, an aliphatic solvent, an aliphatic alcohol, a glycol, and any combination thereof.

10. The method of claim 9, wherein the aliphatic alcohol is a $C_1$-$C_8$ alcohol.

11. The method of claim 9, wherein the glycol is selected from the group consisting of ethylene glycol, diethylene glycol, triethylene glycol, propylene glycol, ethylene glycol monobutyl ether, ethylene glycol ethyl ether, dipropylene glycol methyl ether, a derivative thereof, and any combination thereof.

12. The method of claim 8, wherein the composition comprises from about 10 wt. % to about 90 wt. % of the third component.

13. The method of claim 1, wherein the hydrocarbon fluid comprises at least 10% liquid by volume.

14. The method of claim 1, wherein the hydrocarbon fluid is a dehydrated gaseous medium.

15. The method of claim 14, wherein the dehydrated gaseous medium comprises 7 $lbs_{H2O}$/mmscf (0.11 g/$m^3$) or less.

16. The method of claim 1, wherein the hydrocarbon fluid is thermal heavy oil.

17. The method of claim 1, wherein the hydrocarbon fluid is selected from the group consisting of kerosene, light crude oil, medium crude oil, heavy crude oil, extra heavy crude oil, synthetic crude oil, an oilfield condensate, a petroleum residual, a refined fuel, a distillate fuel, a fuel oil, a heating oil, diesel fuel, gasoline, jet fuel, a bunker fuel oil, and any combination thereof.

18. The method of claim 1, wherein the composition is added to the hydrocarbon fluid such that the alpha amino ether is present in the fluid in an amount ranging from about 0.0001 wt. % to about 1.0 wt. % and/or such that the synergistic compound is present in the fluid in an amount ranging from about 0.0001 wt. % to about 1.0 wt. %.

19. The method of claim 1, wherein the sulfur-containing compound is selected from the group consisting of hydrogen sulfide, a mercaptan, an organic sulfide, and any combination thereof.

20. A method for reducing an amount of a sulfur-containing compound present in a hydrocarbon fluid, comprising:

adding an effective amount of a composition to the hydrocarbon fluid, wherein the composition comprises a sulfide scavenger and a synergistic compound, wherein the sulfide scavenger comprises an alpha amino ether, and wherein the synergistic compound comprises diisopropanolamine.

* * * * *